United States Patent
Roy et al.

(10) Patent No.: US 8,312,339 B2
(45) Date of Patent: Nov. 13, 2012

(54) APPARATUSES AND METHODS FOR CONTROLLING AUTOMATIC REPEAT REQUEST (ARQ) RESET IN BROADBAND WIRELESS COMMUNICATION SYSTEM

(75) Inventors: Abhishek Roy, Suwon-si (KR); Han-Seok Kim, Seoul (KR); Jae-Young Kim, Yongin-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 926 days.

(21) Appl. No.: 12/396,153

(22) Filed: Mar. 2, 2009

(65) Prior Publication Data

US 2009/0228754 A1    Sep. 10, 2009

(30) Foreign Application Priority Data

Mar. 4, 2008  (KR) .................. 10-2008-0019965

(51) Int. Cl.
*G06F 11/00* (2006.01)
(52) U.S. Cl. ........................................ 714/749
(58) Field of Classification Search .................. 714/749
See application file for complete search history.

(56) References Cited

U.S. PATENT DOCUMENTS

| | | | | |
|---|---|---|---|---|
| 7,356,750 B2* | 4/2008 | Fukushima et al. | .......... | 714/748 |
| 7,676,721 B2* | 3/2010 | Kim | ................. | 714/747 |
| 7,742,420 B2* | 6/2010 | Chapman et al. | .............. | 370/236 |
| 7,761,767 B2* | 7/2010 | Chandra et al. | ............... | 714/751 |
| 8,000,256 B2* | 8/2011 | Cha et al. | ........................ | 370/252 |
| 2002/0046379 A1* | 4/2002 | Miki et al. | ........................ | 714/749 |
| 2002/0146037 A1* | 10/2002 | Sugaya et al. | ................. | 370/474 |
| 2003/0009717 A1* | 1/2003 | Fukushima et al. | ........... | 714/748 |
| 2006/0156165 A1* | 7/2006 | Kim | ............................... | 714/749 |
| 2007/0288824 A1* | 12/2007 | Yeo et al. | ........................ | 714/749 |
| 2008/0130619 A1* | 6/2008 | Cha et al. | ........................ | 370/346 |
| 2008/0209297 A1* | 8/2008 | Chandra et al. | ............... | 714/748 |
| 2008/0209300 A1* | 8/2008 | Fukushima et al. | ........... | 714/748 |
| 2010/0251058 A1* | 9/2010 | Chandra et al. | ............... | 714/751 |

FOREIGN PATENT DOCUMENTS

| KR | 10-2001-0081040 B1 | 8/2001 |
|---|---|---|
| KR | 10-2006-0061897 A | 6/2006 |
| KR | 10-2006-0067786 A | 6/2006 |
| KR | 10-2006-0092955 A | 8/2006 |

* cited by examiner

*Primary Examiner* — Bryce Bonzo
(74) *Attorney, Agent, or Firm* — Jefferson IP Law, LLP

(57) ABSTRACT

An apparatus and method for controlling an Automatic Repeat reQuest (ARQ) reset in a broadband wireless communication system are provided. The apparatus includes an Orthogonal Frequency Division Multiplexing (OFDM) sender for receiving one or more data from a transmitter, a controller for determining whether the data is received in order and a memory for constituting selective reset information according to a result of the determining. The method includes receiving one or more data from a transmitter, determining whether the data is received in order and constituting selective reset information according to a result of the checking. Hence, the performance degradation can be prevented by shortening the TCP timeout and the break time (the time of no traffic transmission).

32 Claims, 6 Drawing Sheets

APPARATUSES AND METHODS FOR CONTROLLING AUTOMATIC REPEAT REQUEST (ARQ) RESET IN BROADBAND WIRELESS COMMUNICATION SYSTEM

PRIORITY

This application claims the benefit under 35 U.S.C. §119 (a) of a Korean patent application filed in the Korean Intellectual Property Office on Mar. 4, 2008 and assigned Serial No. 10-2008-0019965, the entire disclosure of which is hereby incorporated by reference.

BACKGROUND OF THE INVENTION

1. Field of the Invention

The present invention relates to an apparatus and method for automatic repeat request. More particularly, the present invention relates to an apparatus and method for selectively discarding a Media Access Control (MAC) Packet Data Unit (PDU) from a retransmission buffer of a broadband wireless communication system.

2. Description of the Related Art

Recently, as the performance of mobile communication terminals has dramatically improved and the data transfer rate of communication networks has increased, a high-speed data communication function is drawing much attention. Particularly, a multi-media service function used by a mobile communication terminal, such as a Digital Multimedia Broadcasting (DMB) service, requires a higher data service rate. Such data communications are carried out by controlling data flows between a terminal and a network (e.g., base station). The terminal sends an Acknowledgement (ACK) in response to packet data received and sets a timeout for the ACK.

To ensure stable transmission under the faster data communication rate of the terminal, the ACK signal should be received from a receiver, which is hereafter referred to as an ARQ-RX and a transmitter, which is hereafter referred to as an ARQ-TX, should operate a timer for the ACK signal. When not receiving the ACK signal during the timer operation, the ARQ-TX performs a retransmission, which is referred to as an Automatic Retransmission reQuest (ARQ).

FIG. 1 illustrates a conventional ARQ reset operation when an ARQ timer expires.

When the ARQ-TX transmits a Protocol Data Unit (PDU) to the ARQ-RX, the ARQ-TX and the ARQ-RX operate their ARQ timers independently of each other. The PDU is a data unit exchanged between peer entities of the same protocol layer. In the downlink, the PDU is a data unit generated for the next lower layer. In the uplink, the PDU is a data unit received from the lower layer.

The PDU blocks are transmitted to the ARQ-RX in an ARQ-TX window 102. The PDU blocks are received from the ARQ-TX in an ARQ-RX window 110.

Herein, the ARQ-TX queues an ACK/Negative ACK (NACK) signal of the PDUs to its retransmission buffer 100 until a response is received from the ARQ-RX. The ARQ-RX stores up to which PDU is received without error.

When the ARQ timer, for example, ARQ_SYNC_LOSS_TIMEOUT expires while waiting for the ACK signal after the PDU transmission, the ARQ-TX sends a ARQ_RESET (0x0) message 104 to the ARQ-RX. Herein, when it is informed of the active data transmission, the ARQ_SYNC_LOSS_TIMEOUT is a maximum time interval allowing the ARQ_TX_WINDOW 102 or the ARQ_RX_WINDOW 110 to sustain the same value before the ARQ-TX and the ARQ-RX declare the synchronization loss.

Upon receiving the ARQ RESET (0x0) 104, the ARQ-RX resets every corresponding ARQ parameter (e.g., initializes the ARQ_RX window 110) and sends a ARQ_RESET (0x1) message 106 to the ARQ-TX. The ARQ-RX waits for the PDU from the ARQ-TX after resetting the ARQ parameters.

Receiving the ARQ_RESET (0x1) message 106 from the ARQ-RX, the ARQ-TX resets the corresponding ARQ parameters to their initial value and empties the retransmission buffer. Next, the ARQ-TX waits for packets from the upper layer (e.g., Transmission Control Protocol (TCP) layer) of the MAC layer and restarts the transmission.

Disadvantageously, the ARQ-TX compromises the MAC PDUs in emptying the retransmission buffer after the ARQ_RESET and the compromised MAC PDUs cause the TCP timeout. As a result, the TCP transmission is affected and the throughput of the TCP transmission is deteriorated.

Accordingly, there is a need for an improved apparatus and method for preventing performance degradation in a broadband wireless communication system.

SUMMARY OF THE INVENTION

An aspect of the present invention is to address at least the above mentioned problems and/or disadvantages and to provide at least the advantages described below. Accordingly, an aspect of the present invention is to provide an apparatus and method for preventing performance degradation in an Automatic Repeat reQuest (ARQ) reset as an ARQ timer expires in a broadband wireless communication system.

According to an aspect of the present invention, an apparatus for controlling an ARQ reset in a broadband wireless communication system is provided. The apparatus includes an Orthogonal Frequency Division Multiplexing (OFDM) sender for receiving one or more data from a transmitter, a controller for determining whether the data is received in order and a memory for constituting selective reset information according to a result of the determining.

According to another aspect of the present invention, an apparatus for controlling an ARQ reset in a broadband wireless communication system is provided. The apparatus includes an OFDM sender for receiving an ARQ reset message from a receiver when an ARQ timer expires and a controller for selectively discarding data in a retransmission buffer using selective reset information of the ARQ reset message.

According to yet another aspect of the present invention, a method for controlling an ARQ reset in a broadband wireless communication system is provided. The method includes receiving one or more data from a transmitter; determining whether the data is received in order and constituting selective reset information according to a result of the determining.

According to still another aspect of the present invention, a method for controlling an ARQ reset in a broadband wireless communication system is provided. The method includes receiving an ARQ reset message from a receiver when an ARQ timer expires and selectively discarding data in a retransmission buffer using selective reset information of the ARQ reset message.

Other aspects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other aspects, features and advantages of certain exemplary embodiments the present invention will be more apparent from the following description taken in conjunction with the accompanying drawings, in which.

Throughout the drawings, like reference numerals will be understood to refer to like parts, components and structures.

DETAILED DESCRIPTION OF EXEMPLARY EMBODIMENTS

The following description with reference to the accompanying drawings is provided to assist in a comprehensive understanding of exemplary embodiments of the present invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. Also, descriptions of well-known functions and constructions are omitted for clarity and conciseness.

The terms and words used in the following description and claims are not limited to the bibliographical meanings, but, are merely used by the inventor to enable a clear and consistent understanding of the invention. Accordingly, it should be apparent to those skilled in the art that the following description of exemplary embodiments of the present invention are provided for illustration purpose only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

By the term "substantially" it is meant that the recited characteristic, parameter, or value need not be achieved exactly, but that deviations or variations, including for example, tolerances, measurement error, measurement accuracy limitations and other factors known to skill in the art, may occur in amounts that do not preclude the effect the characteristic was intended to provide.

Exemplary embodiments of the present invention provide an apparatus and a method for preventing performance degradation in ARQ_RESET in a broadband wireless communication system.

Hereinafter, a transmitter which transmits a Media Access Control (MAC) Protocol Data Unit (PDU) and waits to receive an Acknowledgement (ACK) of the MAC PDU, is referred to as an Automatic Repeat reQuest (ARQ)_TX. A receiver which receives the MAC PDU from the ARQ_TX and sends an ACK of the MAC PDU, is referred to as an ARQ_RX. In the broadband wireless communication system (e.g., Institute of Electrical and Electronics Engineers (IEEE) 802.16 system), the ARQ_TX may be a base station and the ARQ_RX may be a terminal or vice versa. Of course, this is merely for ease of description and not intended to be limiting.

Figure 1:
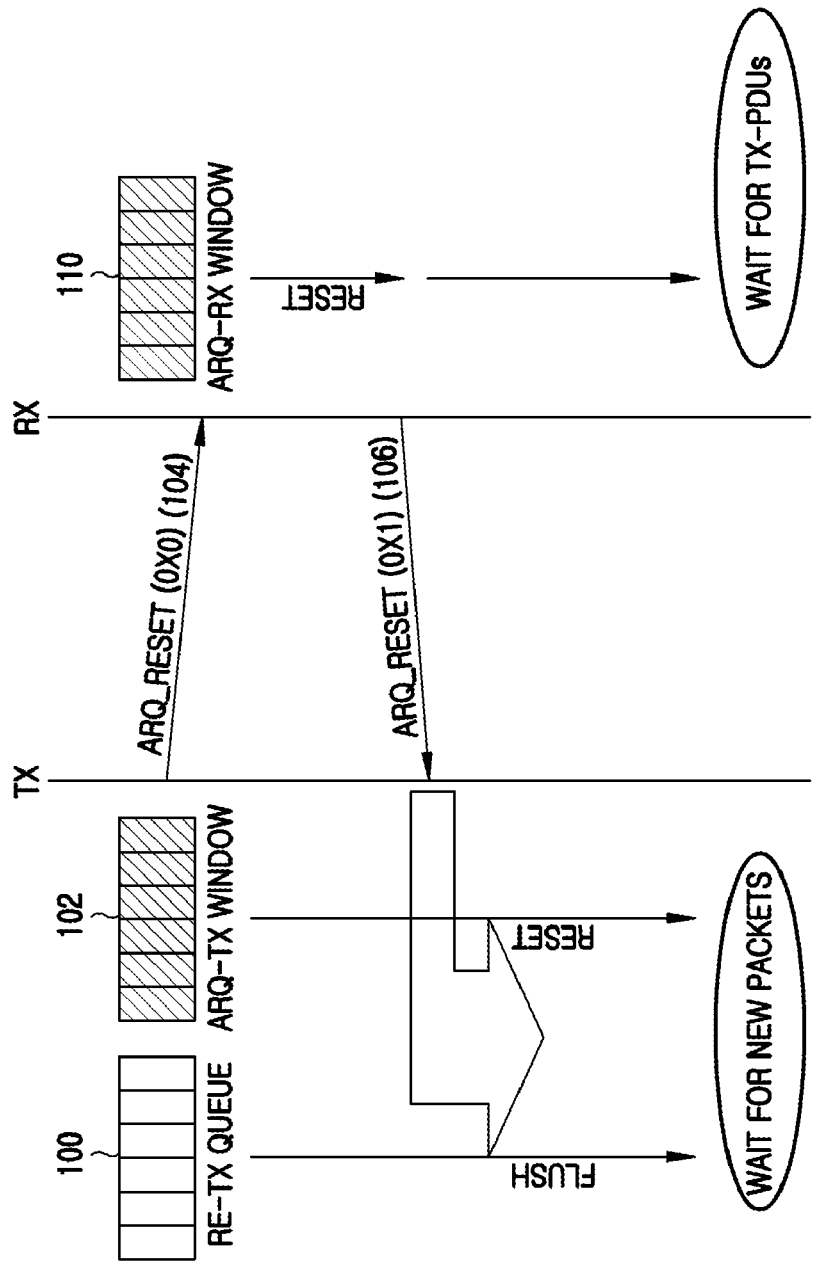
FIG. 1 illustrates a conventional ARQ reset operation when an ARQ timer expires.
Figure 2:
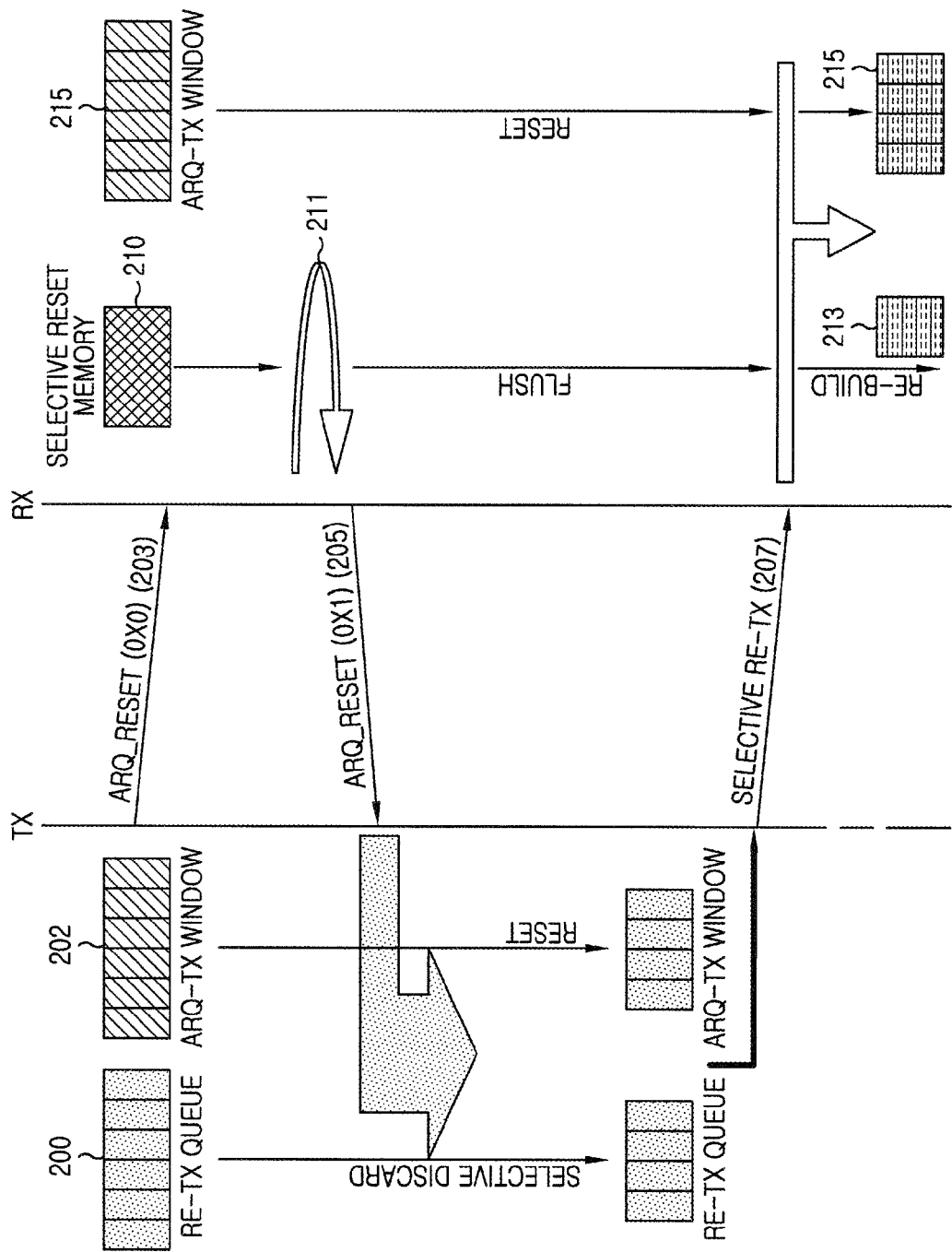
FIG. 2 illustrates an ARQ reset operation according to an exemplary embodiment of the present invention.

FIG. 2 is a flow diagram of an ARQ reset operation according to an exemplary embodiment of the present invention.

Referring to FIG. 2, the ARQ_TX transmits a MAC PDU to the ARQ_RX in an ARQ_TX window 202 and queues the transmitted MAC PDU to a retransmission buffer 200 until an ACK signal is received. When receiving the ACK for the PDU, the ARQ_TX removes the corresponding stored PDU from the retransmission buffer 200.

Upon receiving the PDU blocks from the ARQ_TX in the ARQ_RX_WINDOW 215, the ARQ_RX determines if there is an error and sends ACK/Negative ACK (NACK) accordingly. The ARQ_RX manages a selective reset memory 210 for tracking the received PDU_ID. More specifically, the selective reset memory 210 contains identifiers (IDs) of the latest in-order PDU and the next out-of-order PDUs.

When the ARQ_RESET is needed according to the expiration of the ARQ_SYNC_LOSS_TIMEOUT, the ARQ_TX sends an ARQ_RESET (0x0) message 203 to the ARQ_RX.

The ARQ_RX, receiving the ARQ_RESET (0x0) message 203, resets corresponding ARQ parameters (e.g., initializes the ARQ_RX window 215) and sends an ARQ_RESET (0x1) message 205 to the ARQ_TX in step 211. The ARQ_RX waits for the PDU from the ARQ_TX after resetting the ARQ parameters.

In this exemplary embodiment of the present invention, the format of the ARQ_RESET (0x1) message 205 is modified to include information relating to the PDU_IDs stored in the selective reset memory 210. At this time, the ARQ_RX empties the selective reset memory 210. The format of the ARQ_RESET (0x1) message 205 will be explained in more detail with reference to FIG. 5.

Upon receiving the ARQ_RESET (0x1) message 205 from the ARQ_RX, the ARQ_TX resets the corresponding ARQ parameters to initial values and selectively empties a retransmission buffer 200 of the ARQ_RESET (0x1) message 205. The ARQ_TX selectively discards only the PDU successfully received at the ARQ_RX and sustains the other PDUs in the retransmission buffer 200.

Next, the ARQ_TX requests a bandwidth or initiates the retransmission 207 of the PDUs remaining in the retransmission buffer 200.

Receiving the PDU blocks retransmitted from the ARQ_TX, the ARQ_RX rebuilds information of the PDU_ID in the selective reset memory 210 in step 213.

Figure 3:
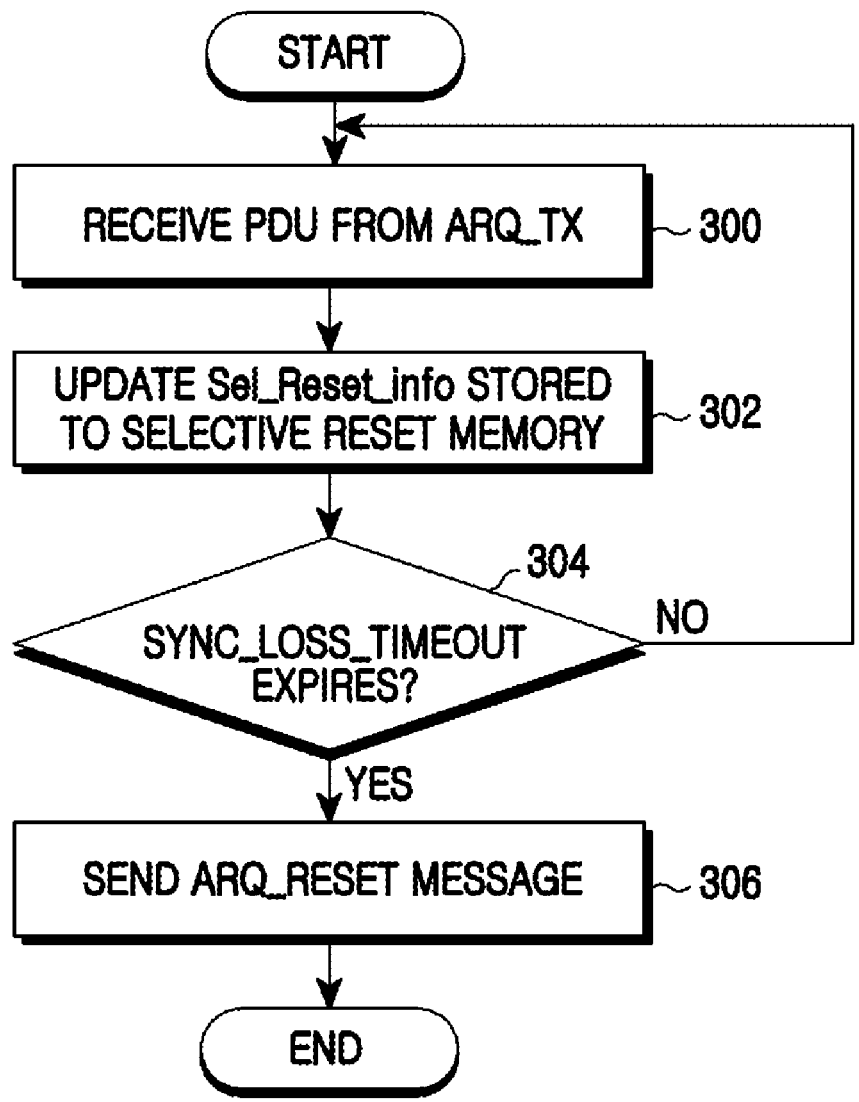
FIG. 3 illustrates ARQ operations of a receiver in a broadband wireless communication system according to an exemplary embodiment of the present invention.

FIG. 3 is a flowchart outlining ARQ operations of a receiver in a broadband wireless communication system according to an exemplary embodiment of the present invention.

Referring to FIG. 3, the ARQ_RX receives one or more PDUs from the ARQ_TX in step 300.

In step 302, the ARQ_RX determines whether the received PDUs are arranged and updates the information of the selective reset memory Sel_Reset_info according to the arrangement.

In more detail, when the PDUs are arranged, the ARQ_RX stores the PDU_ID of the latest in-order PDU. The PDU_ID is updated in every PDU transmission. Accordingly, the PDU_ID of the latest in-order PDU is reflected. In contrast, when the received PDUs are not arranged, the ARQ_RX indicates the successful reception of the corresponding PDUs using a bitmap that, as will be explained in more detail below, represents the string of PDUs from the latest in-order PDU_ID to the very last PDU_ID.

For example, when the ARQ_RX receives 20 PDUs starting with the PDU_ID '11' in succession from the ARQ_TX, the latest in-order PDU_ID is '30'. The latest PDU_ID '30' implies the successful reception up to the PDU having the PDU_ID '30'. In this case, there is no need to update the bitmap information indicative of the out-of-order PDU_ID. The reception of the PDUs can be confirmed merely using the last PDU_ID of the PDUs received in succession without error.

More specifically, it is assumed that the successive 20 PDUs starting with the PDU_ID '11' are transmitted to the ARQ_RX and the ARQ_RX does not receive the PDUs of the PDU_ID '21', '25', '26' and '27' but successfully receives the PDUs of the PDU_ID '11' through '20', '22', '23', '24', '28', '29' and '30'. The latest in-order PDU_ID is '20' and the latest out-of-order PDU_ID is '30'. The bitmap is set to be '0111000111'. The bitmap size is 10 bits, which is a difference between the recent in-order PDU_ID and the latest out-of-order PDU_ID (30−20=10), and indicates the success or failure of reception of the PDUs having the PDU_ID '21' through '30'. In more detail, the bitmap associates one bit for each of the PDU_IDs between the recent in-order PDU_ID and the latest out-of-order PDU_ID and sets a value of each associated bit based on the success or failure of the respective PDU reception. For example, after the PDUs up to the PDU_ID '20' are successfully received, the bitmap of '0111000111' implies that the PDU of the PDU_ID '21' is not received (i.e. '0'), the PDUs of the PDU_ID '22', '23' and '24' are successfully received, the PDUs of the PDU_ID '25' '26' and '27' are not received successfully, and the PDUs of the PDU_ID '28', '29' and '30' are successfully received. While the illustrated example associates a bit of '1' with successful reception, this is merely for example and the associated bit may be set to '0' to reflect successful reception.

In step 304, it is determined if the ARQ_SYNC_LOSS_TIMEOUT expires. When it is determined that the ARQ_SYNC_LOSS_TIMEOUT expires in step 304, the ARQ_RX generates and transmits the ARQ_RESET message including the information of the selective reset memory Sel_Discard_Enable and Sel_Reset_info to the ARQ_TX in step 306. The ARQ_RESET message shall be explained in more detail below with reference to FIG. 5.

The Sel_Discard_Enable field is determined using a function which selectively discards the PDUs in the retransmission buffer of the ARQ_TX, which is referred to as a selective discard function. That is, when the ARQ_TX supports the selective discard function, the Sel_Discard_Enable field is set to '1'. When the ARQ_TX does not support the selective discard function, the Sel_Discard_Enable field is set to '0'.

When the selective discard function is executed, the Sel_Reset_info field is used to discard only the successfully received PDUs and to sustain the other PDUs in the retransmission buffer.

Next, the ARQ_RX finishes this ARQ process.

Figure 4:
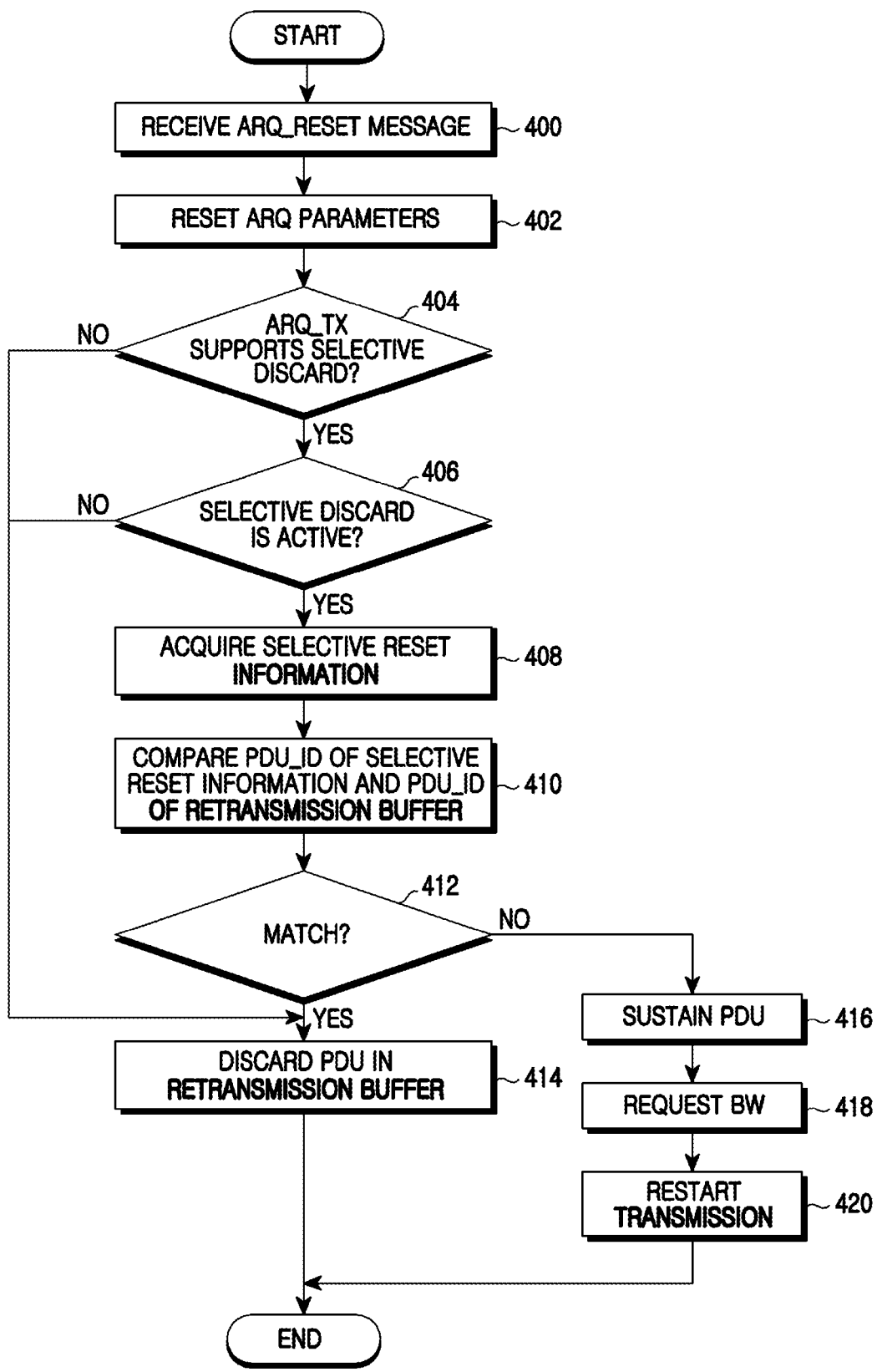
FIG. 4 illustrates an ARQ operation of a transmitter in a broadband wireless communication system according to an exemplary embodiment of the present invention.

FIG. 4 is a flowchart outlining an ARQ operation of a transmitter in a broadband wireless communication system according to an exemplary embodiment of the present invention.

Referring to FIG. 4, after transmitting the PDU, the ARQ_TX receives the ARQ_RESET message from the ARQ_RX according to the ARQ_SYNC_LOSS_TIMEOUT expiration in step 400. The ARQ RESET message will be described in more detail below with reference to FIG. 5.

In step 402, the ARQ_TX sets the ARQ parameters to their initial values. For example, the ARQ_TX initializes the ARQ_TX window.

In step 404, the ARQ_TX determines whether the selective discard function is supported. When it is determined that the selective discard function is supported in step 404, the ARQ_TX determines whether the selective discard function is activated in step 406. When the selective discard function is not supported in step 404, the ARQ_TX removes all the PDUs in the retransmission buffer in step 414.

When the selective discard function is activated in step 406, the ARQ_TX acquires the selective reset information Sel_Reset_info of the ARQ RESET message in step 408 and compares the PDU_ID information of the selective reset information with the PDU_ID information of the retransmission buffer in step 410. By comparing the PDU_ID information of the selective reset information with the PDU_ID information of the retransmission buffer, the ARQ_TX can discard only the PDUs successfully received at the ARQ_RX from the retransmission buffer. In other words, the PDU_ID match implies that the ARQ_RX receives the corresponding PDU of the matching PDU_ID, and the unmatched PDU_ID implies that the ARQ_RX does not receive the corresponding PDU of the unmatched PDU_ID.

When there is at least one matched PDU_ID in step 412, the ARQ_TX discards only the PDUs of the matching PDU_ID from the retransmission buffer in step 414. When the PDU does not match, the ARQ_TX still contains every PDU corresponding to the unmatched PDU_ID in the retransmission buffer in step 416. Next, the ARQ_TX requests the bandwidth in step 418 and waits for new PDUs from the upper layer or retransmits the PDUs remaining in the retransmission buffer in step 420.

When the selective discard function is not active in step 406, the ARQ_TX removes every PDU in the retransmission buffer in step 414.

Next, the ARQ_TX finishes this ARQ process.

Figure 5:
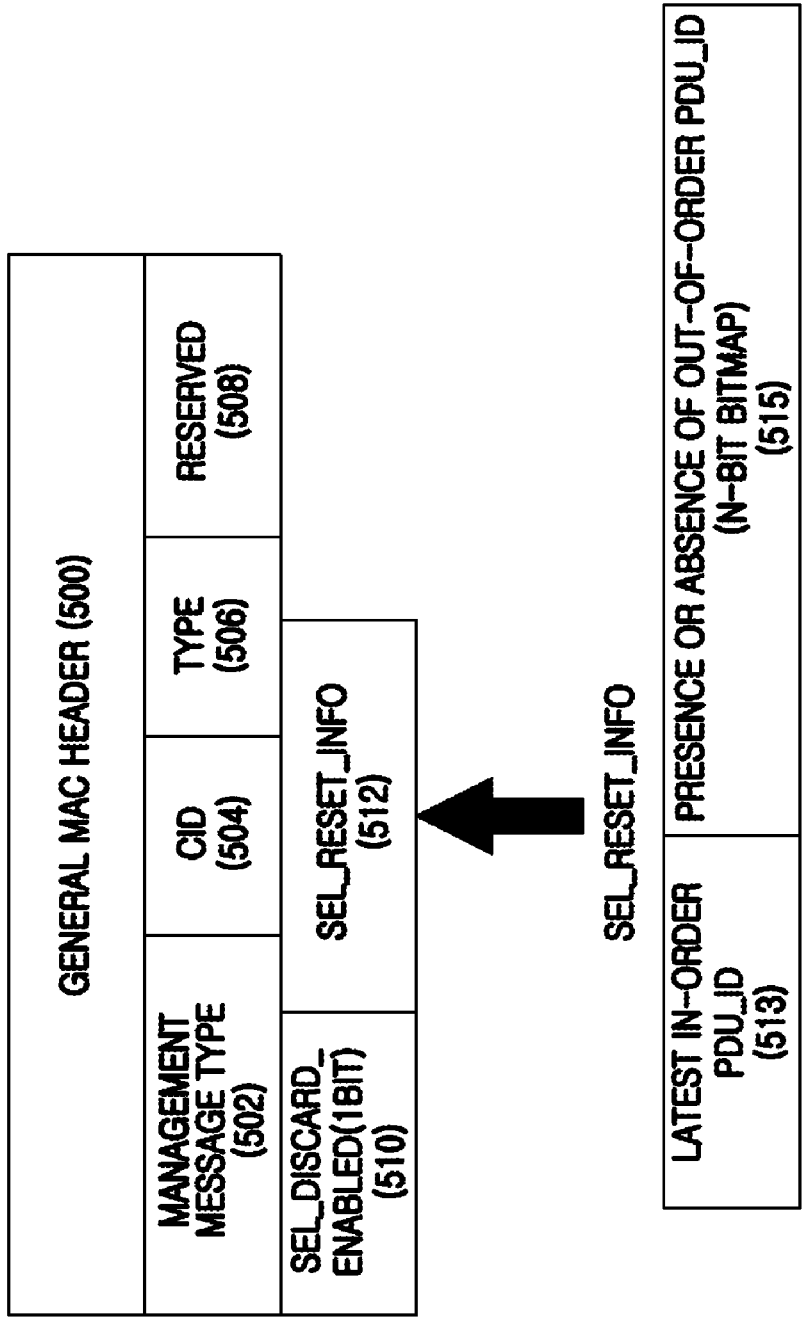
FIG. 5 illustrates an ARQ_RESET message format according to an exemplary embodiment of the present invention.

FIG. 5 depicts an ARQ_RESET message format according to an exemplary embodiment of the present invention.

The ARQ_RESET message format includes a management message type field 502, a CID 504, a type field 506, a reserved field 508, the Sel_Discard_Enable field 510, and the Sel_Reset_info field 512. The management message type field 502, the CID 504, the type field 506, the reserved field 508, the Sel_Discard_Enable field 510, and the Sel_Reset_info field 512 constitute a general MAC header 500.

The management message type field 502 includes information relating to the relevant management message type among defined management messages. The CID 506 includes a connection identifier of the ARQ_RESET message. The type field 506 defines the ARQ_RESET message type. For example, '00' indicates the original message from the transmitter, '01' indicates the ACK from the receiver, '10' indicates confirmation from the transmitter, and '11' indicates reservation.

In this exemplary embodiment, the Sel_Discard_Enable field 510 and the Sel_Reset_info field 512 are added to the existing ARQ RESET message format.

When the Sel_Discard_Enable field single bit is set to '1', the selective discard function is activated in the ARQ RESET process. When the selective discard function is deactivated, the ARQ RESET process is progressed in the existing manner.

The Sel_Reset_info field 512 is used by the ARQ_RX to inform the ARQ_TX of the PDU_ID information. More specifically, the Sel_Reset_info field 512 includes the latest PDU_ID 513 and the bitmap 515 indicative of the presence or absence of the out-of-order PDU_ID. The in-order PDU_ID is represented with bits and the bitmap includes n bits. As in the above example, a bitmap value of '1' implies the successful reception of the corresponding PDU and a value of '0' implies the reception failure of the corresponding PDU. Herein, the bitmap size is the difference between the latest in-order PDU_ID and the latest out-of-order PDU_ID.

For example, when 12 PDUs of the PDU_ID '1' through '10', '15' and '16', the latest in-order PDU_ID 513 is '10' and the latest out-of-order PDU_ID is '16' in the Sel_Reset_info field 512. The bitmap size is 6 bits (16−10=6) and represented as '000011'. The bitmap value of '000011' implies that the PDUs of the PDU_ID '11' through '14' are not successfully received and the PDUs of the PDU_ID '15' and '16' are successfully received. Herein, the PDU_ID '10' is represented as N-bit binary and added to the Sel_Reset_info field 512.

Figure 6:
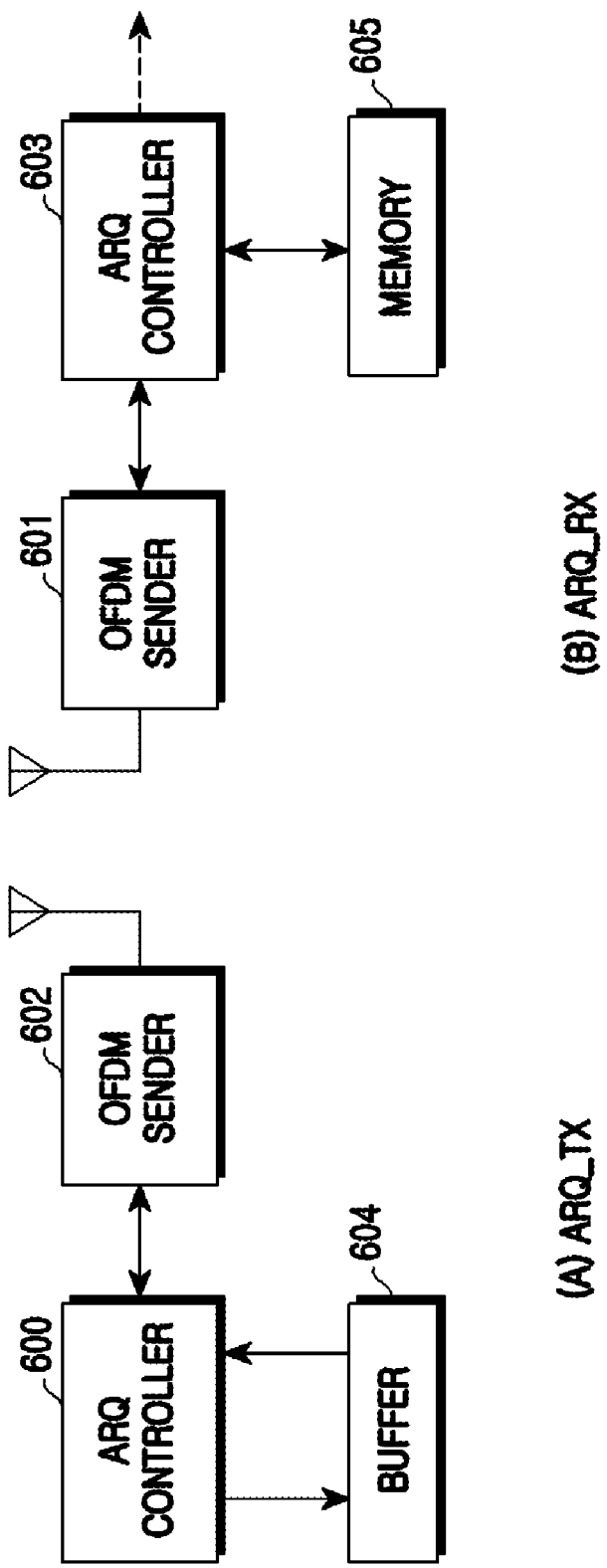
FIG. 6 illustrates a receiving apparatus and a transmitting apparatus for ARQ in a broadband wireless communication system according to an exemplary embodiment of the present invention.

FIG. 6 is a block diagram of a receiving apparatus and a transmitting apparatus for ARQ in a broadband wireless communication system according to an exemplary embodiment of the present invention.

Referring to FIG. 6, the ARQ_RX includes an ARQ controller 603, an Orthogonal Frequency Division Multiplexing (OFDM) sender 601, and a memory 605. The ARQ_TX includes an ARQ controller 600, an OFDM sender 602, and a buffer 604.

The OFDM sender 601 of the ARQ_RX receives one or more data from the ARQ_TX, removes a Cyclic Prefix (CP), performs a Fast Fourier Transform (FFT) operation, and outputs the data to the ARQ controller 603.

The ARQ controller 603 determines whether the data are received from the OFDM sender 601 in order. The ARQ controller 603 sends the ACK or NACK signal of the received data to the ARQ_TX. When the ARQ timer expires, the ARQ controller 603 generates and transmits the ARQ_RESET message including the selective reset information and resets the ARQ parameters to the initial values.

The memory 605 constitutes the selective reset information according to the result from the ARQ controller 603. The selective reset information includes the Sel_Discard_Enable field for determining whether to activate the function of selectively emptying the retransmission buffer of the transmitter, and the Sel_Reset_info field indicative of the data ID information to be discarded from the data stored in the retransmission buffer (see FIG. 5.).

When the data is received in order, the memory 605 stores the ID of the last data based on the received order. When the data is received out of order, the memory 605 generates the bitmap indicative of the presence of at least one data between the in-order data ID (a first data ID) and the out-of-order data ID (a second data ID). Herein, the bitmap size is m−n, which is the difference between the first data ID n and the second data ID m.

In the ARQ_TX, the OFDM sender 602 receives the ARQ_RESET message from the ARQ_RX when the ARQ timer expires.

The ARQ controller 600 selectively discards the data in the retransmission buffer 604 using the selective reset information of the ARQ_RESET message.

The ARQ controller 600 determines whether the selective discard function is active. When the selective discard function is active, the ARQ controller 600 compares the data ID information (first data IDs) of the selective reset information with the data ID information (second data IDs) stored in the retransmission buffer 604 and discards at least one matching data of the first data IDs and the second data IDs from the retransmission buffer 604. The selective discard function is the function of selecting and discarding only the data successfully received at the receiver among the data stored to the retransmission buffer when the ARQ timer expires. Herein, the ARQ controller 600 sustains at least one unmatched data of the first data IDs and the second data IDs in the retransmission buffer 604.

When the selective discard function is not active, the ARQ controller 600 discards all data in the retransmission buffer 604. The ARQ controller 600 determines whether the selective discard function is supported.

After the ARQ reset, the ARQ controller 600 restarts the retransmission by requesting the bandwidth for the data stored in the retransmission buffer.

The ARQ controller 600 selectively discards the data in the retransmission buffer and then waits for new data from the upper layer.

When receiving the ARQ_RESET message, the ARQ controller 600 resets the ARQ parameters.

In the ARQ reset, the PDU of the retransmission buffer is selectively discarded in the broadband wireless communication system. Therefore, the performance degradation can be prevented by shortening the TCP timeout and the break time (the time of no traffic transmission).

While the invention has been shown and described with reference to certain exemplary embodiments thereof, it will be understood by those skilled in the art that various changes in form and details may be made therein without departing from the spirit and scope of the invention as defined by the appended claims and their equivalents.

What is claimed is:

1. An apparatus for controlling an Automatic Retransmission reQuest (ARQ) reset in a wireless communication system, the apparatus comprising:
    an Orthogonal Frequency Division Multiplexing (OFDM) sender for receiving one or more data from a transmitter;
    a controller for determining whether the data is received in order; and
    a memory for constituting selective reset information according to a result of the determining,
    wherein the selective reset information comprises information of data to be discarded from data in a retransmission buffer of the transmitter.

2. The apparatus of claim 1, wherein the selective reset information comprises a sel_discard_enable field indicating whether a function for selectively emptying the retransmission buffer of the transmitter is active, and a sel_reset_info field indicative of identifier (ID) information of data to be selectively discarded from data in the retransmission buffer.

3. The apparatus of claim 1, wherein, when the data is received in order, the memory stores an ID of the latest data received in order.

4. The apparatus of claim 1, wherein, when the data is not received in order, the memory generates a bitmap indicating whether there is one or more data between an in-order data ID, which is a first data ID, and an out-of-order data ID, which is a second data ID.

5. The apparatus of claim 4, wherein a size of the bitmap is determined as a difference between the first data ID (n) and the second data ID (m).

6. The apparatus of claim 1, wherein, when the ARQ timer expires, the controller generates and transmits an ARQ reset message comprising the selective reset information to the transmitter and resets ARQ parameters to initial values.

7. The apparatus of claim 1, wherein the controller sends one of an Acknowledgement (ACK) signal and a Negative ACK (NACK) signal of the received data to the transmitter.

8. An apparatus for controlling an Automatic Retransmission reQuest (ARQ) reset in a wireless communication system, the apparatus comprising:
- an Orthogonal Frequency Division Multiplexing (OFDM) sender for receiving an ARQ reset message from a receiver when an ARQ timer expires; and
- a controller for selectively discarding data in a retransmission buffer using selective reset information of the ARQ reset message,
- wherein the selective reset information comprises information of data successfully received at the receiver.

9. The apparatus of claim 8, wherein the controller determines whether a selective discard function is active and, when the selective discard function is active, compares data identifier (ID) information, which are first data IDs, of the selective reset information with data ID information, which are second data IDs, of data stored to the retransmission buffer, and discards one or more matching data of the first data IDs and the second data IDs.

10. The apparatus of claim 9, wherein the controller sustains one or more unmatched data of the first data IDs and the second data IDs in the retransmission buffer.

11. The apparatus of claim 9, wherein, when the selective discard function is not active, the controller discards all data in the retransmission buffer.

12. The apparatus of claim 9, wherein, when the ARQ timer expires, the selective discard function selects and discards only data successfully received at the receiver among the data stored to the retransmission buffer.

13. The apparatus of claim 8, wherein the controller determines whether the selective discard function is supported.

14. The apparatus of claim 8, wherein the controller performs a retransmission by requesting a bandwidth for the data in the retransmission buffer.

15. The apparatus of claim 8, wherein, after selectively discarding the data in the retransmission buffer, the controller waits for new data from an upper layer.

16. The apparatus of claim 8, wherein, when receiving the ARQ reset message, the controller resets ARQ parameters.

17. A method for controlling an Automatic Retransmission reQuest (ARQ) reset in a wireless communication system, the method comprising:
- receiving one or more data from a transmitter;
- determining whether the data is received in order; and
- constituting selective reset information according to a result of the determining,
- wherein the selective reset information comprises information of data to be discarded from data in a retransmission buffer of the transmitter.

18. The method of claim 17, wherein the selective reset information comprises a sel_discard_enable field indicating whether a function for selectively emptying the retransmission buffer of the transmitter is active, and a sel_reset_info field indicative of identifier (ID) information of data to be selectively discarded from data in the retransmission buffer.

19. The method of claim 17, wherein the constituting of the selective reset information comprises:
- when the data is received in order, storing an ID of latest data received in order.

20. The method of claim 17, wherein the constituting of the selective reset information when the data is not received in order comprises generating a bitmap indicating whether there is one or more data between an in-order data ID, which is a first data ID, and an out-of-order data ID, which is a second data ID.

21. The method of claim 20, further comprising determining a size of the bitmap as a difference between the first data ID (n) and the second data ID (m).

22. The method of claim 17, further comprising:
- when the ARQ timer expires, generating and transmitting an ARQ reset message comprising the selective reset information to the transmitter, and resetting ARQ parameters to initial values.

23. The method of claim 17, further comprising:
- sending one of an Acknowledgement (ACK) signal and a Negative ACK (NACK) signal of the received data to the transmitter.

24. A method for controlling an Automatic Retransmission reQuest (ARQ) reset in a wireless communication system, the method comprising:
- receiving an ARQ reset message from a receiver when an ARQ timer expires; and
- selectively discarding data in a retransmission buffer using selective reset information of the ARQ reset message,
- wherein the selective reset information comprises information of data successfully received at the receiver.

25. The method of claim 24, wherein the selectively discarding of the data in the retransmission buffer comprises:
- determining whether a selective discard function is active;
- when the selective discard function is active, comparing data identifier (ID) information, which are first data IDs, of the selective reset information with data ID information, which are second data IDs, of data stored to the retransmission buffer; and
- discarding one or more matching data of the first data IDs and the second data IDs.

26. The method of claim 25, wherein the selectively discarding of the data in the retransmission buffer further comprises:
- sustaining one or more unmatched data of the first data IDs and the second data IDs in the retransmission buffer.

27. The method of claim 25, further comprising, when the selective discard function is not active, discarding every data in the retransmission buffer.

28. The method of claim 25, wherein, when the ARQ timer expires, the selective discard function selects and discards only data successfully received at the receiver among the data stored to the retransmission buffer.

29. The method of claim 24, further comprising:
- determining whether the selective discard function is supported.

30. The method of claim 24, further comprising:
- performing a retransmission by requesting a bandwidth for the data in the retransmission buffer.

31. The method of claim 24, further comprising:
- after selectively discarding the data in the retransmission buffer, waiting for new data from an upper layer.

32. The method of claim 24, further comprising:
- when receiving the ARQ reset message, resetting ARQ parameters.

* * * * *